United States Patent [19]

Richardson, Jr.

[11] Patent Number: 5,051,079

[45] Date of Patent: Sep. 24, 1991

[54] TWO-PIECE SCROLL MEMBER WITH RECESSED WELDED JOINT

[75] Inventor: Hubert Richardson, Jr., Brooklyn, Mich.

[73] Assignee: Tecumseh Products Company, Tecumseh, Mich.

[21] Appl. No.: 466,201

[22] Filed: Jan. 17, 1990

[51] Int. Cl.[5] ........................ F04C 18/04; B23K 28/00

[52] U.S. Cl. ................................ 418/55.2; 29/888.022

[58] Field of Search ........................ 418/55.2; 29/527.1, 29/888.022

[56] References Cited

U.S. PATENT DOCUMENTS 3,986,799 10/1976 McCullough ......................... 418/56
3,994,635 11/1976 McCullough ......................... 418/57
4,436,495 3/1984 McCullough ....................... 418/55.2
4,457,676 7/1984 Hiraga .................................. 418/57
4,463,591 8/1984 McCullough ......................... 72/360
4,466,784 8/1984 Hiraga ................................ 418/104
4,475,875 10/1984 Sugimoto et al. ................... 418/151
4,487,248 12/1984 Fukushima et al. ................ 164/131
4,487,560 12/1984 Uchikawa et al. .................. 418/178
4,550,480 11/1985 Tanikawa et al. .............. 29/DIG. 4

FOREIGN PATENT DOCUMENTS 59-192881 11/1984 Japan ................................. 418/55.2
59-208186 11/1984 Japan ............................ 29/888.022

*Primary Examiner*—John J. Vrablik

*Attorney, Agent, or Firm*—Jeffers, Hoffman & Niewyk

[57] ABSTRACT

A scroll-type hermetic compressor is disclosed including within a hermetically sealed housing a fixed scroll member assembly and an orbiting scroll member assembly. Each of the fixed and orbiting scroll member assemblies includes a separately formed involute wrap member, which is interconnected with a plate member by retention of an axial end portion of the wrap member within an involute channel in the plate member, as by a welded joint, a sintered joint, a press fit, or an interference fit. The involute channel extends between the face and back surfaces of the plate member, and the axial end portion of the wrap member is disposed within the channel such that an axial end surface of the wrap member is proximate the back surface of the plate member. The plate member of the fixed scroll member assembly is mounted to the frame member, while the plate member of the orbiting scroll member assembly is mounted to a drive hub member.

4 Claims, 4 Drawing Sheets

TWO-PIECE SCROLL MEMBER WITH RECESSED WELDED JOINT

BACKGROUND OF THE INVENTION

The present invention relates generally to a hermetic scroll-type compressor and, more particularly, to such a compressor having intermeshing fixed and orbiting scroll member assemblies, wherein each assembly comprises a separate i;:volute wrap element connected to an end plate assembly.

A typical scroll compressor comprises two facing scroll members, each having an involute wrap, wherein the respective wraps interfit to define a plurality of closed pockets. When one of the scroll members is orbited relative to the other, the pockets travel between a radially outer suction port and a radially inner discharge port to convey and compress the refrigerant fluid.

It is generally believed that the scroll-type compressor could potentially offer quiet, efficient, and low maintenance operation in a variety of refrigeration system applications. However, several design and manufacturing problems persist that have prevented the scroll compressor from achieving wide market acceptance and commercial success. For instance, the fixed and orbiting scroll members are somewhat difficult and expensive to fabricate, thereby increasing the cost of a scroll-type compressor relative to other compressor types, e.g., reciprocating piston and rotary vane.

There are two basic constructional alternatives for fabricating scroll members, namely, forming them from a single piece of metal by machining out the involute wrap, or forming the involute wrap and end plate separately and then joining them into a finished scroll member. Fabricating an integrally formed scroll member requires excessive amounts of time and energy, and produces large quantities of waste metal. Also, computer-controlled milling machines used in mass production of these scroll members are quite expensive. Several methods of connecting a separately formed involute wrap to an end plate to form a scroll member have been proposed; however, none appears to have proven economically feasible for the purpose of mass producing scroll-type compressors.

The present invention is directed to overcoming the aforementioned problems associated with scroll-type compressors, wherein it is desired to provide an improved design for and method of manufacturing fixed and orbiting scroll members in order to reduce the manufacturing difficulty and costs associated therewith.

SUMMARY OF THE INVENTION

The present invention overcomes the problems and disadvantages of the above-described prior art compressors by providing an improved scroll member assembly and method !or making same, wherein a plate member includes an involute channel extending between and opening onto the face and back surfaces of the plate member, in which channel an axial end portion cf an involute wrap member is disposed and retained, thereby operably interconnecting the plate member and the involute wrap member.

More specifically, the present invention provides, in one form thereof, an end plate member having a face surface and a back surface between which an involute channel extends, and an involute wrap member including an axial end portion having an axial end surface. The end plate member and wrap member are interconnected by placement and retention of the axial end portion of the wrap member within the involute channel of the plate member such that the axial end surface of the wrap member is proximate the back surface of the plate member.

In one aspect of the invention, the axial end portion of the wrap member is retained within the involute channel of the plate member by a welded joint between the axial end surface of the wrap member and the plate member, adjacent the back surface thereof. According to another aspect of the invention, the wrap member and the plate member are fabricated from powdered metal, and are interconnected by a sintered joint therebetween. In accordance with a further aspect of the invention, the axial end of the wrap member and the involute channel are tapered such that a press fit is permitted therebetween. In a still further aspect of the invention, an interference fit between the wrap member and plate member is accomplished by thermally reducing and then expanding the size of the wrap member relative to the size of the involute channel.

According to another aspect of the present invention the scroll member assembly is used as either the fixed scroll member or the orbiting scroll member of a scroll-type compressor depending upon whether the plate member of the assembly is mounted to a stationary frame member or an orbiting drive hub member.

An advantage of the scroll member assembly of the present invention is that a separately formed involute wrap member may be easily interconnected with a plate member, thereby facilitating mass production of scroll-type compressors.

Another advantage of the scroll member assembly of the present invention is that the interconnection of a separately formed involute wrap element and a plate member is better able to withstand lateral forces applied to the portion of the wrap member extending axially from the plate member.

A further advantage of the scroll member assembly of the present invention, according to one form thereof, is that involute wrap members and plate members fabricated of different materials may be operably interconnected.

Another advantage of the scroll member assembly of the present invention is that a scroll member may be manufactured with minimal machining operations, thereby reducing manufacturing time and costs.

A still further advantage of the scroll member assembly of the present invention, according to one form thereof, is that the assembly may be incorporated into a scroll-type compressor as either an orbiting scroll member or a fixed scroll member The present invention provides, in one form thereof, a scroll member assembly for use as one of a fixed scroll member and an orbiting scroll member in a scroll-type compressor. The scroll member assembly includes an end plate member having a face surface and a back surface. An involute channel extends through the end plate member and provides communication between the face and back surfaces thereof. The scroll member assembly further includes an involute wrap member extending involutely about a central axis and corresponding in shape to the involute channel of the plate member. The wrap member includes an axial end portion having an axial end surface. The axial end portion is disposed within the involute channel such that the axial end surface is proximate the back surface of the plate member. The axial end portion of the wrap member is retained within the involute channel of the plate member by either a welded joint, a sintered joint, a press fit, or an interference fit therebetween, in accordance with various aspects of the invention.

The invention further provides, in one form thereof, a method of fabricating a scroll member assembly for use in a scroll-type compressor. A first step of the method is providing an end plate member having a face surface and a back surface, wherein the plate member includes an involute channel extending therethrough and providing communication between the face and back surfaces. Another step is providing an involute wrap member extending involutely about a central axis and corresponding in shape to the involute channel of the plate member. The wrap member includes an axial end portion having an axial end surface. A further step of the method is placing the axial end portion of the wrap member within the involute channel such that the axial end surface is proximate the back surface of the plate member. A final step is interconnecting the wrap member and the plate member to prevent removal of the axial end portion of the wrap member from the involute channel of the plate member. According to various aspects of the invention, the step of interconnecting the wrap member and the plate member is performed by welding, sintering, press fitting, or interference fitting.

DESCRIPTION OF THE PREFERRED EMBODIMENT

Figure 1:
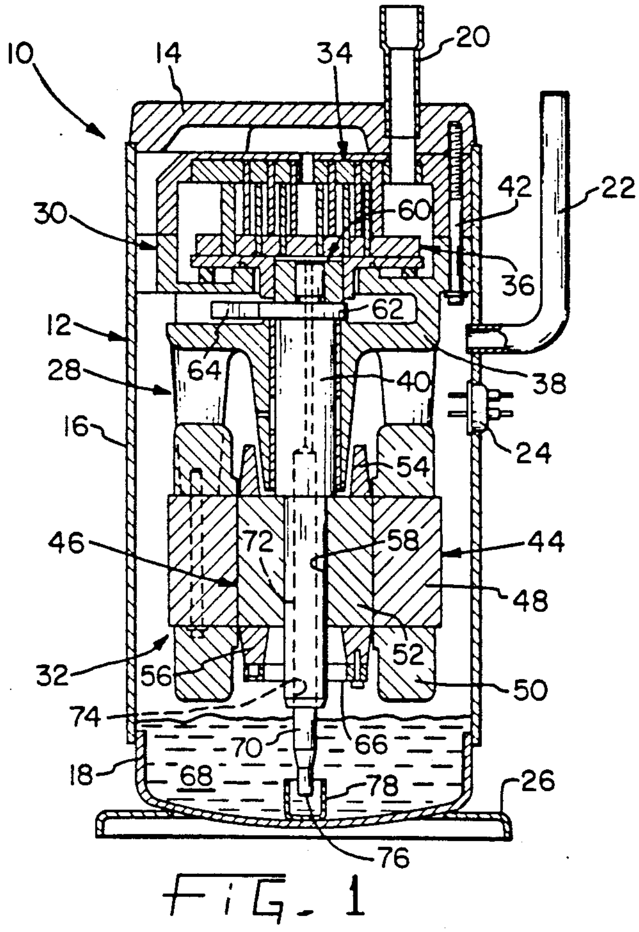
FIG. 1 is a longitudinal sectional view of a hermetic scroll-type compressor of the type to which the present invention pertains.

Referring now to FIG. 1, there is shown a hermetic scroll compressor 10 to which various embodiments of the present invention are applicable, as described hereinafter. Compressor 10 includes a housing 12 comprising a top cover plate 14, a central portion 16, and a bottom portion 18, wherein the three housing portions are hermetically joined, as by welding. Housing 12 includes a suction inlet 20, a discharge outlet 22, and an electrical terminal cluster 24. A mounting plate 26 is welded to bottom portion 18 for mounting the housing in a vertically upright position.

Disposed within housing 12 is a motor-compressor unit 28 comprising a scroll compressor mechanism 30 and an electric motor 32. Scroll compressor mechanism 30 includes a fixed scroll member assembly 34, an orbiting scroll member assembly 36, and a frame member 38. A crankshaft 40 is rotatably journalled in frame member 38, and is operably coupled to orbiting scroll member assembly 36 to effect orbiting motion thereof relative to fixed scroll member assembly 34, thereby causing compression of refrigerant. Accordingly, refrigerant entering suction inlet 20 is compressed and discharged into the housing interior prior to exiting through discharge outlet 22. A plurality of bolts 42 extend through frame member 38 to mount compressor mechanism 30 to top cover plate 14.

Electric motor 32 includes a stator assembly 44 and a rotor assembly 46 that is rotatable about a generally vertical axis. Stator assembly 44 comprises a cylindrical core 48 and windings 50. Rotor assembly 46 comprises a laminate central portion 52 and cast upper and lower end rings 54 and 56, respectively. Central portion 52 has a central aperture 58 provided therein into which is coaxially secured crankshaft 40 by an interference fit. Accordingly, crankshaft 40 is drivingly engaged by rotor assembly 46, whereby motor 32 provides a drive mechanism for compressor mechanism 30.

Figure 2:
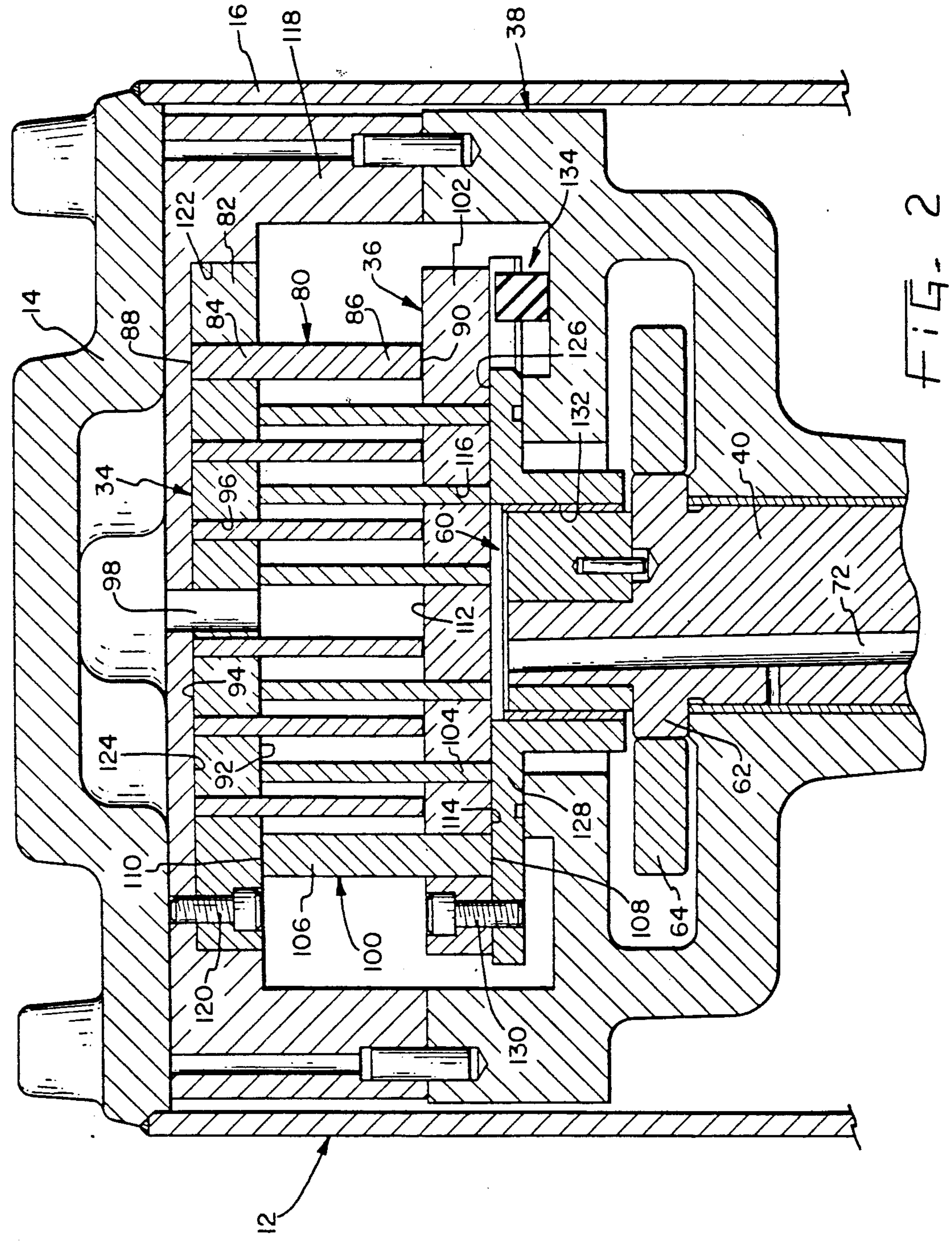
FIG. 2 is an enlarged fragmentary sectional view of the compressor of FIG. 1, particularly showing fixed and orbiting scroll member assemblies in accordance with one embodiment of the present invention.

Referring now to FIGS. 1 and 2, the upper end of crankshaft 40 includes an eccentric crankpin and roller assembly 60, which operably engages the underside of orbiting scroll member assembly 36. Crankshaft 40 also includes a thrust plate 62, intermediate orbiting scroll member assembly 36 and frame member 38, to which is attached a counterweight 64. In order to counterbalance the rotating masses associated with orbiting scroll member assembly 36, a counterbalance weight assembly 66 comprising an arc-shaped weight is attached to lower end ring 56 of rotor assembly 46.

Housing 12 includes an oil sump 68 in the bottom thereof, from which oil is supplied to the compressor mechanism by means of an oil lubrication system which comprises an oil pick-up tube 70 and a vertical oil passageway 72 in crankshaft 40. More specifically, oil pick-up tube 70 is press fit into a counterbore 74 in the lower end of crankshaft 40, and functions upon rotation of crankshaft 40 to draw oil from sump 68 and pump oil upwardly through passageway 72. Oil inlet end 76 of oil pick-up tube 70 extends into the top opening of an oil cup 78, which is welded to the bottom surface of housing bottom portion 18.

Figure 3:
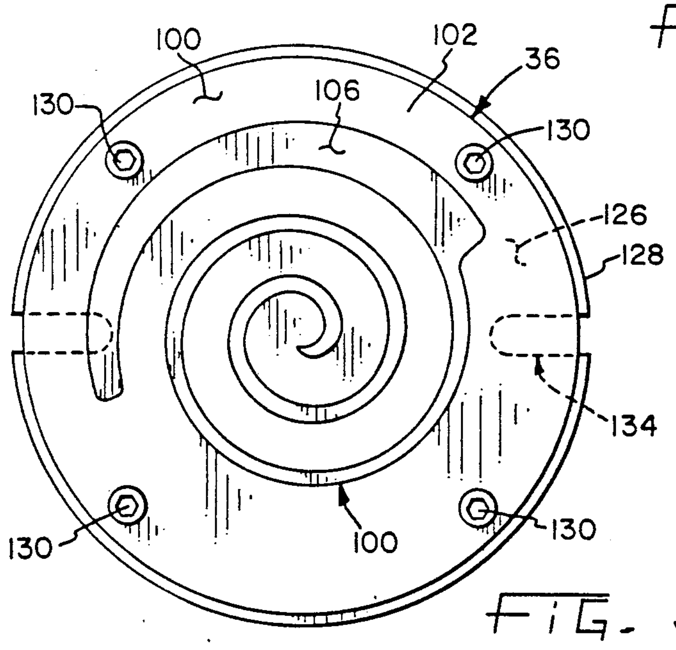
FIG. 3 is an enlarged top view of the orbiting scroll member assembly of the compressor of FIG. 1.
Figure 4:
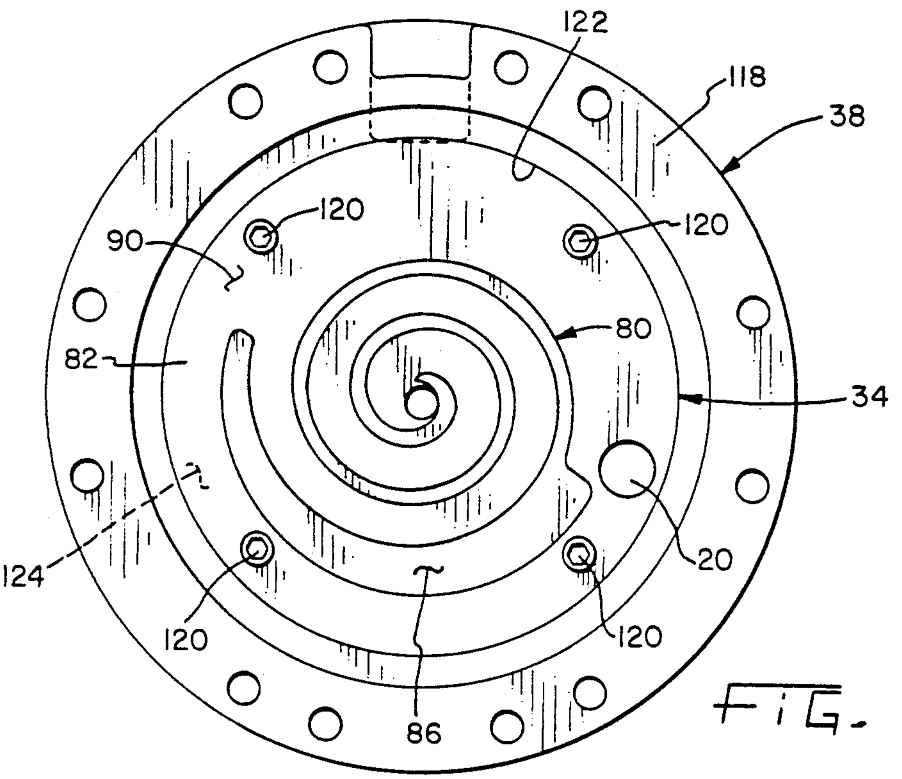
FIG. 4 is an enlarged bottom view of the fixed scroll member assembly of the compressor of FIG. 1.

Referring now to FIGS. 2-4, fixed scroll member assembly 34 and orbiting scroll member assembly 36 will be more particularly described. Specifically, fixed scroll member assembly 34, as shown in FIGS. 2 and 4, includes a separately formed involute wrap member 80 and an end plate member 82 to which wrap member 80 is operably connected in a manner more particularly described hereinafter with respect to several alternative embodiments. Wrap member 80 extends involutely about an imaginary central axis and includes axially opposite end portions 84 and 86 having planar involute end surfaces 88 and 90, respectively.

Plate member 82 of fixed scroll member assembly 34 includes a planar face surface 92 and a planar back surface 94. In involute channel 96, corresponding to the shape of wrap member 80, is formed in end plate member 82 and extends between face surface 92 and back surface 94 thereof. Plate member 82 also includes a central discharge portion 98, which is in fluid communication with the interior of compressor housing 12, according to the disclosed embodiment of FIG. 1. Various methods of forming the channel in the end plate are contemplated, depending on the type of plate material, including milling, punching, casting, molding, or the like.

As illustrated in FIG. 2, axial end portion 84 of wrap member 80 is firmly disposed within involute channel 96 such that axial end surface 88 is proximate back surface 94. In this manner, a strong connection is provided between the wrap member and the plate member, which connection is particularly adapted to withstand lateral forces applied to axial end portion 86 of the wrap member during compressor operation.

Orbiting scroll member assembly 36 is of the same general construction as that of previously described fixed scroll member assembly 34. Specifically, assembly 36, as shown in FIGS. 2 and 3, includes a separately formed involute wrap member 100 and an end plate member 102 to which wrap member 100 is operably connected. Wrap member 100 includes axially opposite end portions 104 and 106 having planar involute end surfaces 108 and 110, respectively. Plate member 102 includes a planar face surface 112, a planar back surface 114, and an involute channel 116 extending therebetween. Wrap member 100 and plate member 102 are interconnected as previously described with respect to fixed scroll member assembly 34.

As illustrated in FIGS. 2 and 4, plate member 82 of fixed scroll member assembly 34 is mounted to an upper portion 118 of stationary frame member 38 by means of four countersunk screws 120. More specifically, plate member 82 is received and retained within a recess 122 in upper portion 118, such that planar back surface 94 is mounted adjacent a planar mounting surface 124 of recess 122. Similarly with respect to orbiting scroll member assembly 36, planar bottom surface 114 of plate member 102 is mounted to the planar top surface 126 of a drive hub member 128 by means of four countersunk screws 130, as illustrated in FIGS. 2 and 3. Drive hub member 128 includes a central opening 132 in which eccentric crankpin and roller assembly 60 is rotatably journalled. A conventional Oldham Ring assembly 134 prevents rotation of orbiting scroll member assembly 36, while permitting orbiting motion thereof.

As previously described with respect to the fixed and orbiting scroll member assemblies of the present invention, an axial end portion of the wrap member is firmly disposed within the involute channel of the plate member. The manner in which the axial end portion is initially placed and subsequently retained within the involute channel will now be described in connection with FIGS. 5A-5D, 6A-6D, 7A-7D, and 8A-8D, representing several alternative embodiments of the present invention. For the sake of convenience, the various embodiments will relate to orbiting scroll member assembly 36, but will be equally applicable to fixed scroll member assembly 34. FIGS. 5A-5D will use the same reference numerals as the embodiment of FIGS. 1-4, while the reference numerals of the remaining embodiments will be in the hundred series corresponding to their 15 respective figures.

Figure 5A:
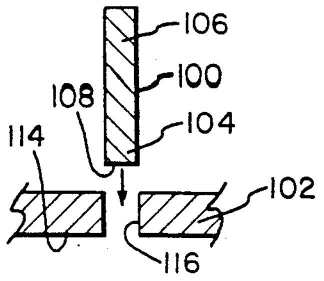
FIGS. 5A–5D are a series of enlarged fragmentary sectional views of the orbiting scroll member assembly of FIG. 1, which illustrate one method of attaching the involute wrap element to the end plate.
Figure 5B:
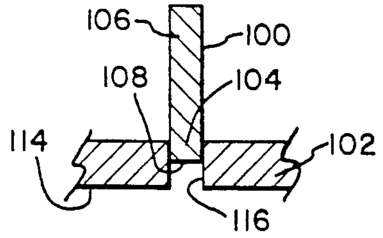
Figure 5C:
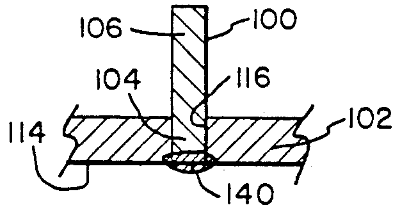
Figure 5D:
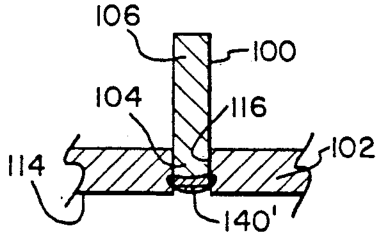

Referring now to FIGS. 5A-5C, separately formed wrap member 100 and plate member 102 (FIG. 5A) are interconnected by sliding axial end portion 104 axially downwardly into involute channel 116 (FIG. 5B) until axial end surface 108 is substantially flush with back surface 114. A welded joint 140 is then made between axial end surface 108 and plate member 102, adjacent bottom surface 114 (FIG. 5C). Alternatively, axial end surface 108 may remain slightly recessed from bottom surface 114, but still proximate thereto, whereby a recessed welded joint 140' is made 25 between the wrap member and the plate member (FIG. 5D). In the embodiment of FIGS. 5A-5D, a close tolerance fit between the axial end portion 104 and involute channel 116 is preferred, in order that lateral forces on axial end portion 106 are transferred to the plate member rather then the welded joint.

Figure 6A:
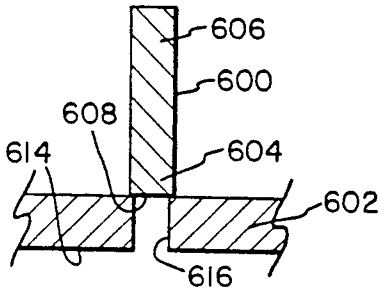
FIGS. 6A–6D are a series of enlarged fragmentary sectional views of the orbiting scroll member assembly of FIG. 1, which illustrate an alternative method of attaching the involute wrap element to the end plate.
Figure 6B:
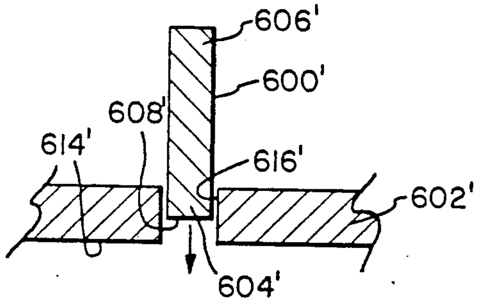
Figure 6C:
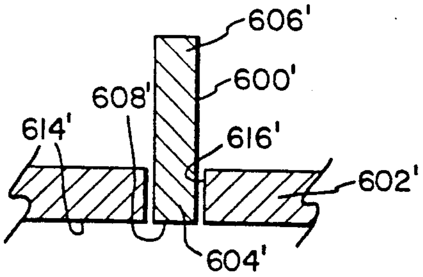
Figure 6D:
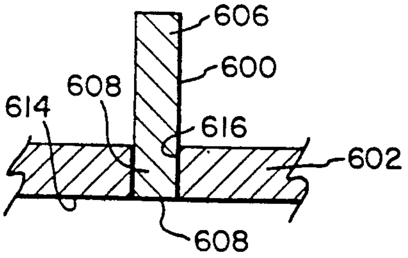

In the embodiment of FIGS. 6A-6D, separately formed wrap member 600 and plate member 602 are initially sized such that axial end portion 604 will not slidingly fit into involute channel 616, as illustrated in FIG. 6. By thermally decreasing the size of the axial end portion relative to the involute channel, as indicated in FIGS. 6B and 6C by primed reference numerals, axial end portion 604' may be slid axially downwardly into involute channel 616' (FIG. 6B) until axial end surface 608' is substantially flush with back surface 614' (FIG. 6C). An interference fit between wrap member 600 and plate member 602 is then established by thermally increasing the size of axial end portion 608 relative to involute channel 616, as illustrated by FIG. 6D. Thermally changing the relative sizes of the wrap member and plate member is performed according to conventional thermal slip fitting methodology, e.g., heating and then cooling the plate member, or cooling and then heating the wrap member.

Figure 7A:
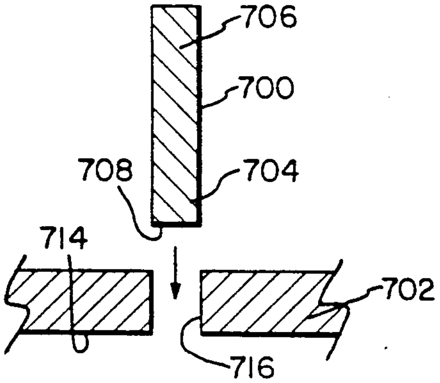
FIGS. 7A–7D are a series of enlarged fragmentary sectional views of an alternative embodiment of an orbiting scroll member assembly for use in the compressor of FIG. 1, particularly illustrating a method of attaching the involute wrap element to the end plate by sintering powdered metal parts.
Figure 7B:
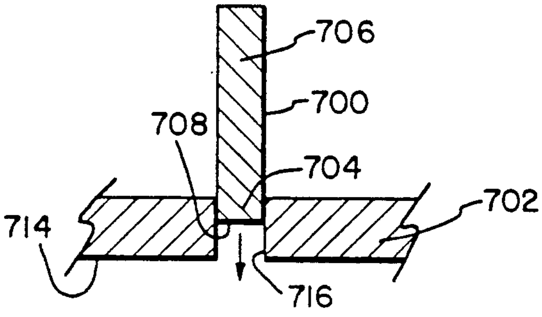
Figure 7C:
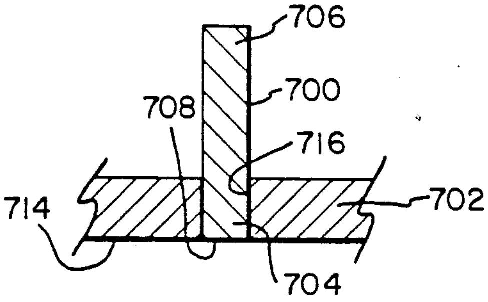
Figure 7D:
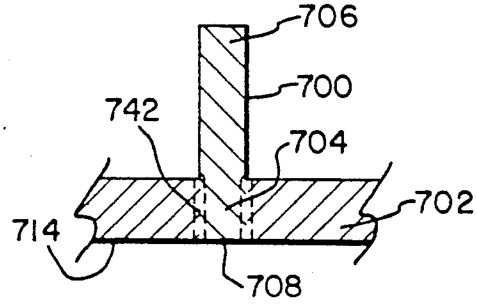

Referring now to FIGS. 7A-7D, wrap member 700 and plate member 702 are formed separately from powdered metal (FIG. 7A), and are interconnected by sliding axial end portion 704 axially downwardly into involute channel 716 (FIG. 7B) until axial end surface 708 is substantially flush with back surface 714 (FIG. 7C). A sintered joint 742 is then made at the interface between axial end portion 704 and involute channel 716, as illustrated in FIG. 7D. One sintering process contemplated for forming sintered joint 742 involves using copper impregnated powdered metal, whereby the parts are interconnected while still in their "green" 25 state and are then heat-cured to form the desired sintered joint.

Figure 8A:
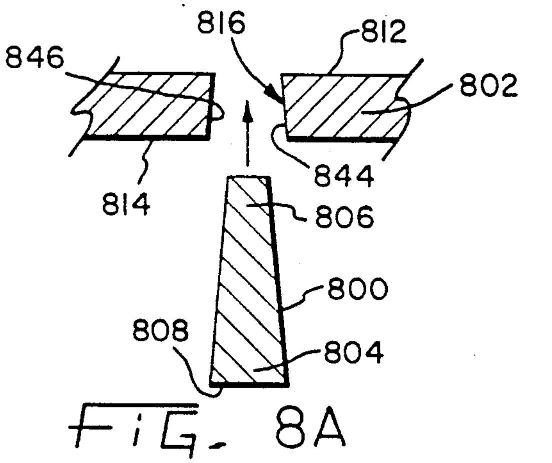
FIGS. 8A–8D are a series of enlarged fragmentary sectional views of an alternative embodiment of an orbiting scroll member assembly for use in the compressor of FIG. 1, wherein the involute wrap element has an trapezoidal cross-sectional shape, which illustrate a method of attaching the involute wrap element to the end plate.
Figure 8B:
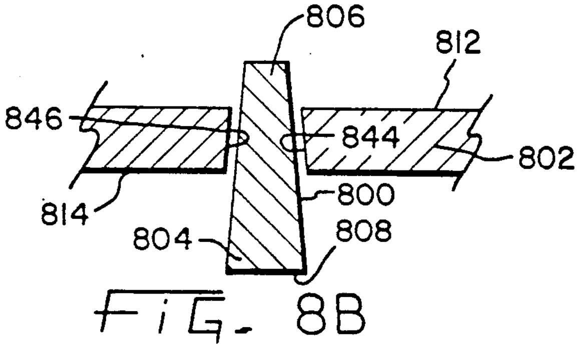
Figure 8C:
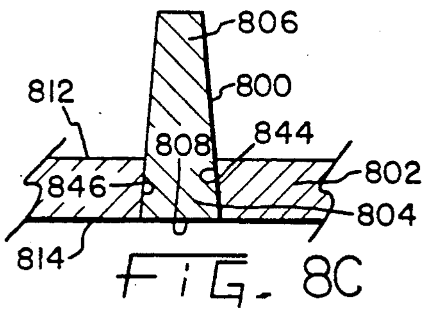

In the embodiment of FIGS. 8A-8C, wrap member 800 has the cross-sectional shape of an isosceles trapezoid, wherein axial end portion 804 comprises a wide base end and opposite axial end portion 806 comprises a narrow tip end. Involute channel 816 of plate member 802 corresponds in shape to axial end portion 804, i.e., radially inner and outer walls 844 and 846 of involute channel 816 converge in the axial direction from bottom surface 814 toward top surface 812. Separately formed wrap member 800 and plate member 802 (FIG. 8A) are interconnected by passing axial end portion 806 upwardly through involute channel 816 (FIG. 8B) until axial end surface 808 is substantially flush with back surface 814 and axial end portion 804 engages walls 844 and 846 of involute channel 816 in a press fit manner (FIG. 8C).

Figure 8D:
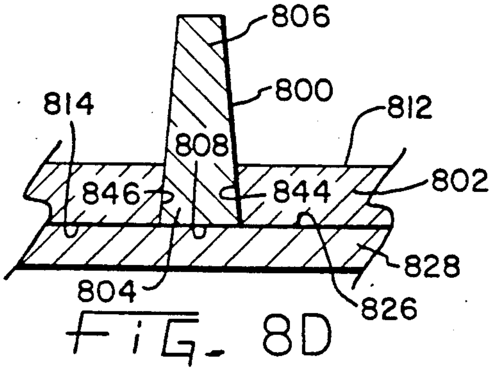

In FIG. 8D, plate member 802 is shown mounted to a drive hub member 828, with back surface 814 of plate member 802 adjacent top surface 826 of drive hub member 828 to form a planar interface therebetween. In this manner, wrap member 800 is further retained within involute channel 816 by abutting contact of axial end surface 808 of wrap member 800 with top surface 826 of hub member 828. In the embodiment of FIG. 8A-8D, a mirror-image wrap member is used for the fixed scroll member assembly in order to provide proper sealing.

In the method of fabricating the scroll member assemblies of the present invention, there is first provided an end plate member having formed therein an involute channel extending between the top and bottom surfaces of the plate member. Also, an involute wrap member is provided, which extends involutely about a central axis and has an axial end portion including an axial end surface. The involute shape of the wrap member corresponds with the involute channel in the plate member. The axial end portion of the wrap member is placed within the involute channel such that the axial end surface is proximate the bottom surface of the plate member, and is retained therein in accordance with one of the previously described alternative embodiments of the present invention.

The interconnection between the wrap member and plate member, according to the aforementioned alternative embodiments of the present invention, differs according to the manner in which the axial end portion of the wrap member is retained within the involute channel. Specifically, in the embodiment of FIGS. 5A-5D, the welded joint is at the extreme axial end surface of the wrap member, i.e., an involute weld bead is proximate the bottom surface of the plate member. In the remaining embodiments of FIGS. 6A-6D, 7A-7D, and 8A-8D, the retention means acts substantially along the entire axial length of the interface between the axial end portion and the involute channel.

With reference to FIGS. 5A-5D, 6A-6D, and 7A-7D, the wrap member associated with either the fixed scroll member assembly or the orbiting scroll member assembly of the present invention is of a rectangular cross-sectional shape. Accordingly, the axial end portions of the wrap member are interchangeable, i.e., either end of the wrap member may constitute the axial end retained within a correspondingly shaped involute channel of a plate member. In other words, the same basic wrap member part may be used for both the fixed and orbiting scroll member assemblies, provided that the involute channel of the respective plate member is appropriately formed.

It will be appreciated that a wrap member according to the present invention may be constructed by a molding process that utilizes plastic, aluminum, ceramic, powdered metal, or any other suitable material. The molding process will be such that the wrap member can be used with as little additional machining as possible, thereby significantly reducing the cost of making the scroll parts. The molding process also permits the incorporation of a variety of tip seal geometries into the molded wrap member without requiring additional machining.

It will be appreciated that the foregoing description of various embodiments of the invention is presented by way of illustration only and not by way of any limitation, and that various alternatives and modifications may be made to the illustrated embodiments without departing from the spirit and scope of the invention.

What is claimed is:

1. A scroll member assembly for use as a fixed or orbiting scroll member in a scroll-type compressor, comprising:

an end plate member having a face surface and a back surface, said plate member including an involute channel extending therethrough and providing communication between said face surface and said back surface;

an involute wrap member extending involutely about a central axis and corresponding in shape to said involute channel of said plate member, said wrap member including an axial end portion having an axial end surface, said axial end portion being disposed within said involute channel such that said axial end surface is proximate said back surface of said plate member;

means for retaining said axial end portion of said wrap member within said involute channel of said plate member;

said means for retaining said axial end portion of said wrap member within said involute channel of said plate member comprising a welded joint between said axial end surface of said wrap member and said plate member adjacent said back surface thereof;

said axial end surface of said wrap member and said welded joint are recessed from said back surface of said plate member within said involute channel.

2. The scroll member assembly of claim 1, in combination with a hermetic scroll compressor apparatus including a scroll compressor mechanism within a hermetically sealed housing, in which:

said compressor mechanism includes a stationary frame member to which said plate member is fixedly mounted.

3. The scroll member assembly of claim 1, in combination with a hermetic scroll compressor apparatus including a scroll compressor mechanism within a hermetically sealed housing, in which:

said compressor mechanism includes drive means operably coupled to said plate member for imparting orbiting motion to said scroll member assembly.

4. The combination of claim 3 in which:

said drive means comprises a drive hub member to which said plate member is fixedly mounted, means for preventing rotation of said drive hub member, and a rotatable crankshaft having an eccentric drive portion operably coupled to said drive hub member to impart orbiting motion thereto.

* * * * *